United States Patent [19]

Anosov et al.

[11] 4,283,595

[45] Aug. 11, 1981

[54] HIGH VOLTAGE CONDUCTOR TERMINAL

[75] Inventors: Oleg V. Anosov; Alexandr G. Mirzoev; Jury V. Obraztsov, all of Moscow, U.S.S.R.

[73] Assignee: Lackenbach, Lilling & Siegel, Scarsdale, N.Y.

[21] Appl. No.: 95,666

[22] Filed: Nov. 19, 1979

Related U.S. Application Data

[63] Continuation-in-part of Ser. No. 33,474, Apr. 26, 1979, abandoned, which is a continuation of Ser. No. 808,120, Jun. 20, 1977, abandoned.

[30] Foreign Application Priority Data

Jun. 25, 1976 [SU] U.S.S.R. .............................. 2377112

[51] Int. Cl.³ .................. H02G 150/064; H01B 17/42
[52] U.S. Cl. .................................. 174/73 R; 174/142
[58] Field of Search ............... 174/73 R, 73 SC, 80, 174/127, 142, 143

[56] References Cited

U.S. PATENT DOCUMENTS

| 1,773,713 | 8/1930 | Austin | 174/73 SC X |
| 2,745,897 | 5/1956 | Nicholas | 174/73 SC |

FOREIGN PATENT DOCUMENTS

| 225867 | 12/1959 | Australia | 174/73 R |
| 1007846 | 5/1957 | Fed. Rep. of Germany | 174/142 |
| 1911212 | 9/1970 | Fed. Rep. of Germany | 174/73 R |
| 2053896 | 4/1972 | Fed. Rep. of Germany | 174/73 R |
| 1068593 | 5/1967 | United Kingdom | 174/73 R |
| 1174712 | 12/1969 | United Kingdom | 174/73 R |

Primary Examiner—Laramie E. Askin
Attorney, Agent, or Firm—Lackenbach, Lilling & Siegel

[57] ABSTRACT

A high-voltage conductor terminal, having screened insulation, comprises at least one insulation bush arranged at the end of the conductor in contact with the insulation of said conductor. A first screen envelopes the insulation of the conductor. A second or additional screen envelopes the end of the conductor, stretching beyond the butt end of the insulation bush, and is made as a portion coated with an electrically conductive material, which is in contact with the insulation of the conductor and connected to said conductor. The butt ends of the insulation bush are provided with annular toroid-shaped grooves each having screens made as portions coated with an electrically conductive material. The screen of one of the annular grooves of the insulation bush is connected to the first screen of the insulation of the conductor, and the screen, facing the end of said conductor, of another of the annular grooves of the insulation bush is connected to the second or additional screen of the insulation of the conductor. The ratio of the minimum distance between the annular grooves to the thickness of the insulation of the conductor is selected within the limits of about 0.2 to 5, and the permittivities of the materials of the insulation bush and the insulation of the conductor are selected to be approximately equal.

6 Claims, 2 Drawing Figures

HIGH VOLTAGE CONDUCTOR TERMINAL

REFERENCE TO RELATED APPLICATIONS

This application is a continuation-in-part of prior Application No. 33,474 filed on April 26, 1979 under the title "High Voltage Insulating Device", now abandoned, which is a continuation of Application No. 808,120 filed on June 20, 1977 and now abandoned.

FIELD OF THE INVENTION

This invention relates to high voltage conductor terminals.

High voltage conductor terminals are used for terminating high voltage cables, for lead-ins of cables to electrotechnical apparatuses, as well as for feed-through insulators.

DESCRIPTION OF THE PRIOR ART

High voltage conductor terminals are, as a rule, comparatively long, since it is not possible to obtain a uniformly distributed electrical field throughout the length of such terminals without some special devices, such as capacitor elements, additional screens or other devices for active control of the electric field.

There is known a high voltage terminal (cf., British Pat. No. 1,068,593) for a conductor having screened insulation, comprising an insulation bush arranged at the end of the conductor and in contact with the insulation of said conductor. The end of the conductor, which is enveloped by the insulation, stretches beyond the butt end of the insulation bush. The insulation bush comprises a head and a levelling taper. The lower part of the head features an annular toroid groove. The surface of this groove and of the taper have a screen made as a coating of an electrically conductive material, which is in contact with the screen of the conductor. The materials of the insulation bush and of the conductor insulation have similar electrical characteristics, in particular, similar permittivity.

Such a high voltage conductor terminal is relatively long. Its design prevents uniform distribution of the electric field throughout the length of the terminal and concentration of said electric field within the volume of the insulation of the conductor and the insulation bush.

There is also known a high voltage terminal (cf., Federal Republic of Germany allowed Application No. 1,007,846 published May 9, 1957) of a conductor having screened insulation, comprising at least one insulation bush arranged at the end of the conductor and placed in contact with the insulation of the conductor and provided with annular toroid shaped grooves concentric to the conductor at the butt ends thereof. Screens are made as coatings of an electrically conductive material on the surface of the annular grooves and one screen faces the end of said conductor connected to this conductor. The insulation bush has a cylindrical shape and is made of a ceramic material with an admixture of titanium dioxide, having high permittivity which is much greater than the permittivity of the material of the conductor insulation.

Such a design of a high voltage conductor terminal permits uniform distribution of the electric field through-out the length thereof. However, the length of such a terminal is still considerable, since the length of the insulation bush should be determined on the basis of the permissible tangential intensity of the electric field over the surface of the conductor insulation, which is substantially (about 1/10) less as compared to the permissible radial intensity of the electric field in the insulation of the conductor.

Besides, such a high voltage conductor terminal is characterized by appreciable dielectric losses.

SUMMARY OF THE INVENTION

It is an object of the invention to provide a high voltage conductor terminal whose design permits at least a twofold decrease of the length thereof.

The essense of the invention consists of a high voltage terminal of a conductor having screened insulation, comprising at least one insulation bush arranged at the end of the conductor, placed in contact with the insulation of the conductor and provided with annular toroid-shaped grooves made concentric to the conductor in the butt ends of the bush with screens made as coatings of an electrically conductive material arranged on the surface of the annular grooves. The screen coating on the surface of one of the annular grooves is electrically connected to the screening of the conductor insulation. According to the invention, the ratio of the minimum distance between the annular grooves to the thickness of the conductor insulation is selected within the range of about 0.2 to 5, and the permittivities of the materials of the insulation bush and the insulation of the conductor is selected to be approximately equal for the concentration of the electric field within the volume of the insulation bush and the insulation of the conductor. An additional screen is provided for the conductor and is made as a coating of an electrically conductive material on the end of the conductor, stretching beyond the butt end of the insulation bush. It is in contact with the insulation of the conductor and is electrically connected to the conductor and to the coating on the surface of the groove, facing the end of the conductor. Such a device is intended for the distribution of electric field concentrated within the volume of the insulation bush and the insulation of the conductor throughout the length of the high voltage conductor terminal during impulse voltages.

Such design of a high voltage terminal permits at least a twofold reduction of the length thereof, which contributes to minimizing the dimensions of electrical apparatuses.

Other objects and advantages of the proposed invention will become apparent from the subsequent detailed description of the invention.

BRIEF DESCRIPTION OF THE DRAWINGS

The invention will now be described in greater detail with reference to specific embodiments thereof, taken in conjunction with the accompanying drawings, wherein.

DETAILED DESCRIPTION OF THE INVENTION

Figure 1:
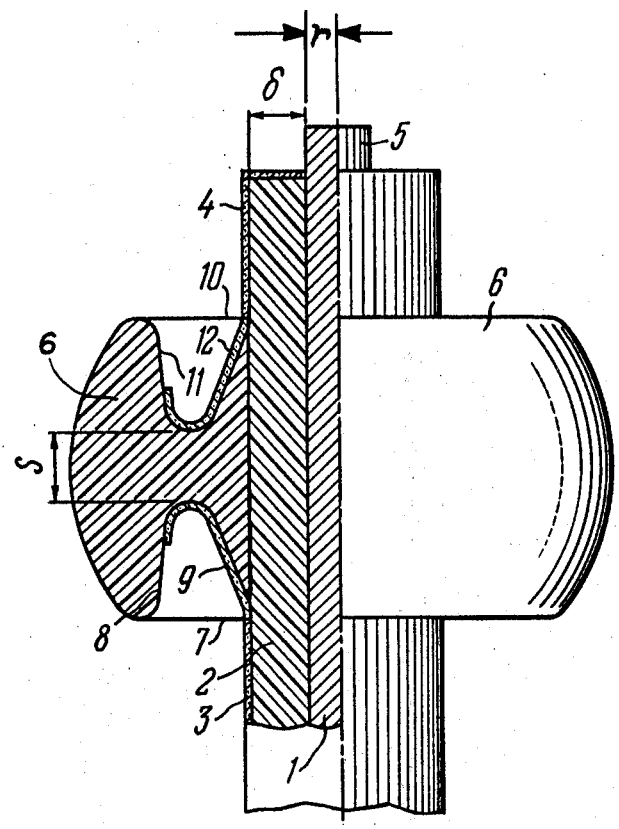
FIG. 1 is a partial longitudinal sectional view of a high voltage terminal featuring one insulation bush, according to the invention.

In a high voltage terminal, a conductor 1 (FIG. 1) is made of copper or aluminum and has an insulation 2 made of cross-linked polyethylene, featuring on the outside a first screen 3 made as a coating of an electrically conductive material, such as electrically conductive cross-linked polyethylene.

The terminal is provided with a second or additional screen 4 made as a coating of an electrically conductive varnish. The screen 4 envelops an outstretching end 5 of the conductor 1, contacts the insulation 2 of the conductor 1 and is electrically connected to the conductor 1.

A high voltage terminal also comprises one insulation bush 6 made of cross-linked polyethylene. The bush 6 is arranged at the end 5 of the conductor 1. A butt end 7 of said insulation bush 6 is provided with an annular toroid-shaped groove 8 made concentric to the conductor 1. A part of the surface of said groove 8 is shielded by a screen 9 which is in contact with the screen 3. The screen 9 is made as a coating of an electrically conductive varnish. An opposite butt end 10 of the bush 6 is also provided with an annular toroid-shaped groove 11 concentric to the conductor 1. A part of the surface thereof is protected by a screen 12 connected to the additional screen 4.

The insulation bush 6 is tightly fitted on the insulation 2 of the conductor 1.

The insulation bush 6 can also be made of any other insulating material, but it is preferable that the permittivities of the materials of the bush 6 and of the insulation 2 of the conductor 1 are approximately equal.

In order to obtain a uniform distribution of the electric field throughout the length of the proposed terminal, the ratio of the minimum distance S between the toroid grooves 8 and 11 to the thickness δ of the insulation 2 of the conductor 1 should be selected within the range of about 0.2 to 5.

The distance S between the toroid-shaped annular grooves 8 and 11 in a terminal featuring one bush 6 can be found from the relation:

$$S = \frac{E_1}{E_2} r \ln \frac{r + \delta}{r},$$

where:
- $E_1$—breakdown strength of the material of the conductor insulation;
- $E_2$—breakdown strength of the material of the insulation bush;
- $r$—conductor radius;
- $\delta$—thickness of the conductor insulation.

Distribution of the electric field throughout the length of the high voltage terminal is controlled by selection of values of S, the radius of the annular grooves and the dimensions of the insulation bush 6.

Figure 2:
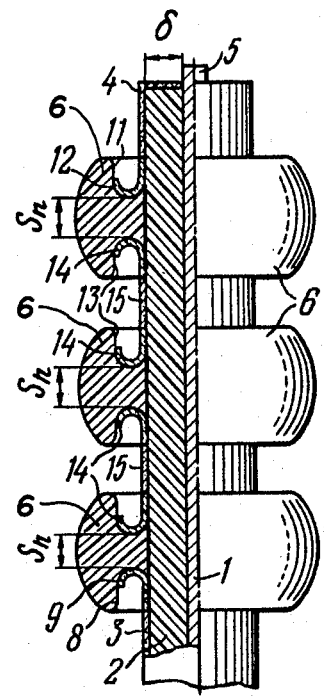
FIG. 2 is a partial longitudinal sectional view of a high voltage terminal featuring three insulation bushes, according to the invention.

The high voltage terminal can be provided with several insulation bushes 6. FIG. 2 illustrates a terminal featuring three insulation bushes 6. The butt ends of all bushes 6 facing each other have annular toroid-shaped grooves 13. A part of the surface of these grooves 13 is protected by coating them with screens 14 of an electrically conductive material, such as an electrically conductive varnish.

Screens 15 made of an electrically conductive varnish are arranged between the insulation bushes 6. Said screens 15 are in contact with the screens 14 and are the screening coating of the insulation 2 of the conductor 1.

If the annular grooves 13 and the screens 14 of the insulation bushes 6 are made in such a way that the electrical capacities between the screens 9 and 14, 14 and 14 and 14 and 12 diminish in the direction from the screen 3 towards the end 5 of the conductor 1, uniform distribution of the electric field can be achieved throughout the length of the high voltage terminal.

A uniform electric field throughout the length of the high voltage terminal featuring several insulation bushes can be obtained by appropriately selecting the distance $S_n$ between the toroid-shaped grooves 8 and 13, 13 and 13 and 13 and 11, the radii of these grooves 8, 11 and 13, as well as the permittivity of the material of the bushes 6.

This distance $S_n$ can be found in accordance with the formula:

$$S_n = \frac{E_1}{nE_2} r \ln \frac{r + \delta}{r},$$

where n is the number of bushes 6.

Such design of a high voltage terminal permits concentration of the electric field within the volume of the insulation bushes 6 and the insulation 2 of the conductor 1.

Toroid-shaped screened surfaces in the annular grooves 8, 11 and 13 on the butt ends of the insulation bushes 6, selected ratios of the minimum distance $S_n$ between the toroid-shaped grooves 8,11 and 13 to the thickness of the insulation 2 of the conductor 1, as well as selected materials of the insulation 2 of the conductor 1 and of the insulation bushes 6, characterized by approximately equal permittivity, ensure a slightly irregular electric field within the volume of the insulation 2 of the conductor 1 and of the insulation bushes 6 and uniform distribution of the electric potential over the external surface of the insulation bushes 6.

The portion of the conductor 1, extending beyond the butt end of the insulation bush 6, with selected electrical resistance of the screen 4 enveloping this portion, ensures definite distribution of voltage over the length of the high voltage terminal, particularly during impulse voltage.

These advantages of the proposed high voltage terminal, where there is a close contact between the insulation 2 of the conductor 1 and the insulation bush 6 (the insulation 2 and the bush 6 are preferably welded together), result in at least a twofold decrease of the length of the high voltage conductor terminal.

What is claimed is:

1. A high voltage terminal for a conductor having insulation, comprising:
   a first screen made as a coating of an electrically conductive material on an outer surface of said insulation;
   a second screen made as a coating of an electrically conductive material on an outer surface of said insulation near an end of said conductor, said second screen being in contact with said end of said conductor;
   at least one insulation bush arranged near said end of said conductor and between said first and second screens, said end of said conductor extending beyond a first butt end of said insulation bush, said insulation bush being in contact with said insulation of said conductor and being made of a material having a permittivity approximately equal to the permittivity of the material of said insulation of said conductor, said first butt end and a second butt end of said insulation bush having annular toroid-shaped grooves, the ratio of the minimum distance between said grooves of said butt ends to the thickness of said insulation of said conductor being within the range of about 0.2 to 5;
a third screen made as a coating of an electrically conductive material on an outer surface of said groove of said first butt end of said insulation bush, said third screen being in contact with said second screen; and
a fourth screen made as a coating of an electrically conductive material on an outer surface of said groove of said second butt end of said insulation bush, said fourth screen being in contact with said first screen.

2. A high voltage terminal according to claim 1, wherein the minimum distance(s) between said grooves of said butt ends of each insulation bush is determined by the formula:

$$S = \frac{E_1}{E_2} r \ln \frac{r + \delta}{r}$$

where $E_1$ is the breakdown strength of said material of said insulation, $E_2$ is the breakdown strength of said material of the insulation bush, r is the radius of the conductor, and $\delta$ is the thickness of the insulation.

3. A high voltage terminal according to either of claim 1 or 2, wherein said insulation, said first screen and each of said insulation bushes are made of cross-linked polyethylene; and said second, third and fourth screens are made of electrically conductive varnish.

4. A high voltage terminal according to claim 1, wherein there are at least three insulation bushes, said third screen of a last-in-order insulation bush being in contact with said second screen of said insulation, said fourth screen of a first-in-order insulation bush being in contact with said first screen of said insulation, the electrical capacities of said screens of said insulation bush decreasing from said first-in-order to said last-in-order insulation bushes; and further comprising;
additional screens made as coatings of an electrically conductive material on outer surfaces of said insulation, said fourth screen of said last-in-order insulation bush, said third screen of said first-in-order insulation bush, and said third and fourth screens of remaining insulation bushes being in contact with respective additional screens of said insulation.

5. A high voltage terminal according to claim 4, wherein the minimum distance ($S_n$) between said grooves of said butt ends of each insulation bush is determined by the formula:

$$S_n = \frac{E_1}{nE_2} r \ln \frac{r + \delta}{r}$$

wherein $E_1$ is the breakdown strength of said material of said insulation, $E_2$ is the breakdown strength of said material of the insulation bushes, r is the radius of the conductor, $\delta$ is the thickness of the insulation, and n is the number of insulation bushes.

6. A high voltage terminal according to either of claims 4 or 5, wherein said insulation, said first screen and each of said insulation bushes are made of cross-linked polyethylene; and said second, third, fourth and additional screens are made of electrically conductive varnish.

* * * * *